Patented Nov. 12, 1935

2,020,901

UNITED STATES PATENT OFFICE 2,020,901

PROCESS FOR PRODUCING PICTURES

Alfred Miller, Wolfen, Kreis Bitterfeld, Germany, assignor to Agfa Ansco Corporation, Binghamton, N. Y., a corporation of New York No Drawing. Application February 27, 1930, Serial No. 431,962. In Germany January 29, 1929

3 Claims. (Cl. 95—6)

My present invention relates to photography and more particularly to a process in which alterations of the physical or chemical qualities of cellulose derivatives, which alterations occur when cellulose derivatives mixed with certain products are exposed to the action of light, are utilized to form a picture.

I have found that the physical or chemical properties or both of cellulose derivatives are changed by mixing them with certain light sensitive materials and then exposing them to light. The alteration of the cellulose derivative used manifests itself particularly by its swelling power and altered solubility and, furthermore, by its capacity for being colored or by its chemical reactivity.

I use this observation to produce pictures, drawings, figures, patterns, designs or the like on surfaces consisting wholly or in part of a cellulose derivative mixed with a suitable light sensitive material by exposing such layers under an original to be copied, so that an alteration of the properties of the cellulose derivative creates differentiation within the layer. By a suitable developing treatment described hereafter, a photographic picture is obtainable.

For my new process I may use all cellulose derivatives in the widest sense, such as for instance, nitrocellulose, lower and higher saturated or unsaturated, substituted or not substituted fat-acid esters and cyclic carboxylic acid esters of cellulose, mixed esters of cellulose, cellulose ethers, and cellulose ether esters, amino derivatives of cellulose or the like. Of this group of cellulose derivatives I enumerate the following, my invention, however, is not limited to these specific cellulose compounds:—Cellulose acetate, cellulose propionate, cellulose butyrate, cellulose stearate, cellulose palmitate, cellulose ricinoleate, cellulose oleate, cellulose laurate, cellulose naphthenate, or cellulose nitrate acetate, cellulose acetate butyrate, cellulose acetate laurate, cellulose butyrate laurate, cellulose acetate butyrate laurate, or methyl—or ethyl cellulose, soluble or insoluble in water, or benzyl cellulose or ethyl cellulose butyrate. The surfaces to be provided with drawings or designs may consist of such cellulose derivatives, or of mixtures thereof with resins, softening agents, filling materials, pigments, or the like. Also textile fabrics, the fibers of which consist either wholly or in part of cellulose derivatives, can be used.

As light sensitive material to be mixed with a cellulose derivative any inorganic or organic compounds may be employed which when exposed to light are capable of changing the physical or chemical properties of the cellulose derivative. The following compounds may be used for this purpose, my invention, however, is not limited to these specific products:—Alkali metal bichromates, a mixture of ferric ammonium citrate and potassium ferricyanide, a silver halogenide, a light sensitive diazo compound and so on. Furthermore, I may use mixtures of such materials or I may incorporate into the cellulose derivative a mixture of compounds which interact with formation of a light sensitive product of the kind above described.

In order to increase the light sensitiveness a suitable catalyst may be added, as for instance, a heavy metal salt.

In another mode of applying my invention I incorporate into the cellulose derivative a material which when exposed to light does not itself change the cellulose derivative, but reacts with another product which is either already present or subsequently added, in such a manner that at the exposed places the physical or chemical properties of the cellulose derivative are changed.

If the light sensitive material incorporated into the cellulose derivative does not itself change its color under the action of light, in most cases after exposure the eye will not detect any alteration in the layer, and the picture must be made visible by a suitable treatment. By the exposure to light the layer of the cellulose derivative has received a selective gradation with respect to its sensitiveness to swelling agents, solvents, dyestuffs, and chemical reagents. In order to render visible the drawing or the like produced in the layer by the exposure to light under a pattern, either the chemical or the physical properties of the nonexposed or of the exposed parts may be utilized in suitable manner, whereupon either a negative or a positive image of the original is obtained. Thus for instance, the layer may be treated with a solvent which dissolves only the unexposed parts of it, and subsequently the remaining, that is to say the exposed parts, are stained. In the same manner a liquid may be used which causes to swell only the exposed or the unexposed parts and thus produces a relief which may like-wise be stained. Furthermore, solutions of dyestuffs may be employed which dye either the exposed or the unexposed parts of the layer. Finally, the changed chemical reactivity may also be utilized for saponifying or further esterifying or etherifying the exposed or the unexposed parts of the layer, and the particular capacity for being dyed of the cellulose derivative thus changed, may be used for the production of the picture desired. The practicability of the process varies within wide limits according to the various liquids, dyestuff-solutions and chemical reagents used for its accomplishment.

As originals there may be employed any halftone picture, copy and line work for graphic art, or any picture produced by means of screen processes; also any kind of stencil.

The process is well suited for the treatment of smooth or coarse, plane or arched surfaces, for the decoration or ornamentation of tissues or mixed other textile fabrics, for figuring linoleum, oil-cloth, washable wall-paper or the like.

The process can also be applied for numerous purposes in graphic printing. The surfaces treated according to the present invention can be utilized as lithographic printing blocks. Furthermore, layers of the most varied kinds can be applied to metal surfaces and used for the preparation of printing blocks in the etching-resist process by dissolving out either the exposed or the unexposed parts of the layer and treating the metal support in known manner with an acid through the openings thus produced. In a similar manner designs can be produced by corrosion on glass, metal or similar materials.

The following examples illustrate the invention, the parts being by volume if not otherwise indicated. However, my invention is not limited to the details given in the examples.

*Example 1.*—To 20 parts of a solution of acetylcellulose of 2 per cent strength in acetone are added 4 parts of a sodium bichromate solution of 6 per cent strength in methanol. The solution is applied on a glass plate in the form of a thin layer, dried, and exposed behind a line negative. The layer is developed by means of acetone in which the unexposed parts remain soluble. The residual picture can be colored by means of a suitable color solution, for instance, with an alcoholic solution of methylene blue of 1 per cent strength.

*Example 2.*—An offset-zinc plate is covered according to known methods with 10 parts of an aqueous solution of methylcellulose of 2 per cent strength, with 2 parts of an aqueous solution of ferric ammonium citrate of 35 per cent strength and with 1 part of a solution of potassium ferricyanide of 20 per cent strength, exposed behind a negative, inked with a fatty ink, developed by means of water and finished in the usual manner.

*Example 3.*—20 parts of a nitrocellulose solution in glycolmonomethyl acetate of 3 per cent strength are sensitized by means of 3 parts of a solution of sodium bichromate in methanol of 6 per cent strength and applied onto a glass plate. By exposing the plate thus covered to light in a reflectographic manner and subsequently developing it with the aid of a mixture of ethyl alcohol and glycolmonomethyl acetate a picture is obtainable which can readily be colored.

*Example 4.*—A silver-bromide-collodion negative is developed according to known methods, fixed, and treated with water for a short time. The picture is bleached out with a solution of copper bromide in alcohol of 1 per cent strength and introduced in a bath consisting of an aqueous solution of potassium bichromate of 1 per cent strength. By a subsequent treatment with a mixture of ethanol and methanol in the ratio 2:1 the parts of the collodion layer which are free from silver are dissolved. Thereupon the negative may be dyed or intensified. The collodion layer may also be poured directly onto a metal plate and treated as above, whereby there are immediately formed parts which act as a resist to etching fluids.

*Example 5.*—0.25 parts by weight of the diazo compound of aminonaphthol-4-sulforic acid and 0.25 parts by weight of resorcin are added to 100 parts of a solution of nitrocellulose in methanol of 1 per cent strength. This mixture is applied in a thin layer onto a zinc plate, the layer is dried and exposed behind a line negative. The light sensitive layer is developed by means of a mixture containing 10 parts of an aqueous caustic soda solution of 10 per cent strength, 90 parts of ethanol, 300 parts of methanol and 25 parts of acetone, whereby the unexposed parts are dissolved.

*Example 6.*—A solution of 2 parts by weight of nitrocellulose and 1 part by weight of shellac in 300 parts of cyclohexanone is sensitized by means of 150 parts of a solution of sodium bichromate in methanol of 5 per cent strength and applied to a metal plate. The layer thus produced is dried, exposed and developed by means of cyclohexanone. A positive picture is produced from a positive. When developed with methanol a negative picture is obtained from a positive.

*Example 7.*—Silk fabric is soaked with 20 parts of a solution of an amino cellulose derivative prepared according to German Patent No. 473,097 and rendered light sensitive by addition of 4 parts of a sodium bichromate solution in methanol of 5 per cent strength, dried, exposed behind a stencil and developed by means of acetone. Thereupon the silk fabric thus treated can be dyed at the places which were not exposed to light.

What I claim is:—

1. A process of producing a relief which comprises forming a layer consisting of a cellulose derivative which is insensitive to light and a light-sensitive material selected from the group consisting of bichromates and ferric-ammonium-citrate, exposing the sensitized layer behind an original to secure a solubility differential of the cellulose derivative, and treating the exposed layer with a solvent having a different solvent action upon the exposed and unexposed portions to form a relief.

2. A process of producing a relief which comprises forming a layer consisting of a cellulose derivative which is insensitive to light and a bichromate, exposing the sensitized layer behind an original to secure a solubility differential of the cellulose derivative, and treating the exposed layer with a solvent having a different solvent action upon the exposed and unexposed portions to form a relief.

3. The process of producing pictures, drawings, figures, patterns, designs which comprises casting on a glass plate a thin layer consisting of cellulose acetate and sodium bichromate from a solution consisting of 20 parts of a solution of cellulose acetate of 2 per cent strength in acetone to which 4 parts of a sodium bichromate solution of 6 per cent strength in methanol have been added, exposing said layer behind a line negative, developing said exposed layer by means of acetone, and coloring said developed layer with an alcoholic solution of methylene blue of 1 per cent strength.

ALFRED MILLER.